(12) United States Patent
Kim

(10) Patent No.: US 12,362,612 B2
(45) Date of Patent: Jul. 15, 2025

(54) MOTOR WITH A MAGNET FIXING GUIDE

(71) Applicant: LG INNOTEK CO., LTD., Seoul (KR)

(72) Inventor: Kyung Ju Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 346 days.

(21) Appl. No.: 17/757,904

(22) PCT Filed: Dec. 1, 2020

(86) PCT No.: PCT/KR2020/017364
§ 371 (c)(1),
(2) Date: Jun. 23, 2022

(87) PCT Pub. No.: WO2021/132919
PCT Pub. Date: Jul. 1, 2021

(65) Prior Publication Data
US 2023/0034346 A1     Feb. 2, 2023

(30) Foreign Application Priority Data

Dec. 23, 2019   (KR) .................. 10-2019-0173169

(51) Int. Cl.
*H02K 1/278*  (2022.01)
*H02K 1/28*   (2006.01)
*H02K 7/00*   (2006.01)

(52) U.S. Cl.
CPC .............. *H02K 1/278* (2013.01); *H02K 1/28* (2013.01); *H02K 7/003* (2013.01)

(58) Field of Classification Search
CPC ........ H02K 1/278; H02K 21/14; H02K 16/02; H02K 2201/06; H02K 1/2781; H02K 1/2783; H02K 1/28; H02K 1/30; H02K 7/003; H02K 1/274; H02K 7/083; H02K 2213/03; H02K 21/16
(Continued)

(56) References Cited

U.S. PATENT DOCUMENTS

2002/0105243 A1  8/2002  Pfetzer
2013/0241336 A1  9/2013  Kottmyer et al.
(Continued)

FOREIGN PATENT DOCUMENTS

CN      207994760 U    10/2018
DE   102017223622 A  *  6/2019  ............. H02K 1/278
(Continued)

OTHER PUBLICATIONS

KR20190136326A translation by worldwide.espacenet.com (Year: 2019).*
(Continued)

*Primary Examiner* — Alexander A Singh
(74) *Attorney, Agent, or Firm* — Saliwanchik, Lloyd & Eisenschenk

(57) ABSTRACT

The present invention may provide a motor including a housing, a stator disposed in the housing, a shaft disposed in the stator, a guide part in contact with an outer circumferential surface of the shaft, and a magnet coupled to the guide part, wherein the guide part includes a first guide disposed on a side surface of the shaft and a second guide extending from the first guide in an axial direction.

9 Claims, 21 Drawing Sheets

(58) Field of Classification Search
USPC ............ 310/156.55, 156.09, 156.08, 156.12
See application file for complete search history.

(56) References Cited

U.S. PATENT DOCUMENTS

| | | | | |
|---|---|---|---|---|
| 2018/0097413 A1* | 4/2018 | Sun et al. | ................ | H02K 1/28 310/156.31 |
| 2019/0386528 A1* | 12/2019 | Lee et al. | ................ | H02K 1/27 310/156.01 |

FOREIGN PATENT DOCUMENTS

| | | | | | |
|---|---|---|---|---|---|
| JP | 2002-104208 | A | | 4/2002 | |
| JP | 2003-530055 | A | | 10/2003 | |
| JP | 2007-209169 | A | | 8/2007 | |
| JP | 4319635 | B2 | | 6/2009 | |
| JP | 2011-67057 | A | | 3/2011 | |
| JP | 2011067057 | A | * | 3/2011 | ............... H02K 1/27 |
| JP | 5858220 | B2 | | 12/2015 | |
| JP | 2016-214008 | A | | 12/2016 | |
| JP | 6430058 | B1 | | 11/2018 | |
| JP | 2019-115121 | A | | 7/2019 | |
| KR | 10-2015-0030627 | A | | 3/2015 | |
| KR | 20190136326 | A | * | 12/2019 | ............. B62D 15/02 |

OTHER PUBLICATIONS

DE 102017223622 A translation by worldwide.espacenet.com (Year: 2019).*
IP.com translation of JP2011067057A (Year: 2011).*
Supplementary European Search Report dated May 22, 2023 in European Application No. 20905730.6.
International Search Report dated Mar. 15, 2021 in International Application No. PCT/KR2020/017364.
Office Action dated May 28, 2024 in Japanese Application No. 2022-539062.

* cited by examiner

MOTOR WITH A MAGNET FIXING GUIDE

CROSS-REFERENCE TO RELATED APPLICATIONS

This application is the U.S. national stage application of International Patent Application No. PCT/KR2020/017364, filed Dec. 1, 2020, which claims the benefit under 35 U.S.C. § 119 of Korean Application No. 10-2019-0173169, filed Dec. 23, 2019, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, in an electronic power steering (EPS) system in which a motor is used, an electronic control unit drives the motor according to traveling conditions to secure turning stability and quickly provide a restoring force. Accordingly, a vehicle driver can drive safely.

A motor includes a shaft and a stator. The shaft may be a hollow type shaft. Magnets may be attached to an outer circumferential surface of the shaft. In this case, the hollow type shaft has a problem that it is difficult to align positions of the magnets. This is because it is difficult to form a guide for aligning the magnets in consideration of a machining process of the hollow type shaft. When there is no guide for aligning the magnets with the shaft, there may be a problem that the magnets are misaligned when the magnets are overmolded. In addition, when the magnets are surrounded by a can or adhesive member, there is a possibility of the magnets moving.

Technical Problem

The present invention is directed to providing a motor in which magnets disposed on an outer circumferential surface of a hollow type shaft are fixedly arranged.

Technical Solution

One aspect of the present invention provides a motor including a housing, a stator disposed in the housing, a shaft disposed in the stator, a guide part coupled to the shaft, and a magnet coupled to the guide part, wherein the guide part includes a first guide disposed on a side surface of the shaft and a second guide extending from the first guide in an axial direction.

The first guide may be disposed on one surface of the magnet, and the second guide may be disposed on a side surface of the magnet.

The magnet may include a first unit magnet and a second unit magnet, and the second guide may be disposed between the first unit magnet and the second unit magnet.

A length of the second guide may be smaller than a length of the magnet.

The second guide may include an extension part in contact with a part of an outer side surface of the magnet.

Another aspect of the present invention provides a motor including a housing, a stator disposed in the housing, a shaft disposed in the stator, a guide part coupled to the shaft, and a magnet coupled to the guide part, wherein the guide part includes a first guide disposed at one side of the magnet and a second guide extending from the first guide, the second guide includes a body and an extension part extending from the body, and a part of the magnet is disposed between the extension part and the shaft.

The magnet may include a first unit magnet and a second unit magnet, and the body may be disposed between the first unit magnet and the second unit magnet.

The extension part may include a first extension part in contact with a part of an outer side surface of the first unit magnet and a second extension part in contact with an outer side surface of the second unit magnet.

The guide part may include a protrusion, the shaft may include a hole, and the protrusion of the guide part may be inserted into the hole of the shaft.

The first guide may have a shape corresponding to a shape of an outer circumference of the shaft.

The guide part may include a third guide disposed at the other side of the magnet.

The guide part may include a first guide part and a second guide part, the first guide part may be coupled to a part of an outer circumferential surface of the shaft, and the second guide part may be coupled to the other part of the outer circumferential surface of the shaft.

The first guide part and the second guide part may have semi-circular shapes.

The magnet may be fixed to an outer side surface of the shaft by the extension part of the second guide.

Advantageous Effects

According to embodiments, an advantageous effect of easily aligning magnets disposed on an outer circumferential surface of a hollow type shaft is provided.

According to the embodiments, there is an advantage of preventing the magnets from being misaligned during assembly.

According to the embodiments, there is an advantage of fixing the magnets to the shaft without using an adhesive.

According to the embodiments, since a guide part formed of a plastic material is used to prevent a magnetic flux from leaking, there is an advantage in that the performance of the motor is improved.

MODES OF THE INVENTION

A direction parallel to a longitudinal direction (vertical direction) of a shaft is referred to as an axial direction, a direction perpendicular to the axial direction based on a center of the shaft is referred to as a radial direction, and a direction along a circumference of a circle having a radius based on the shaft is referred to as a circumferential direction.

Figure 1:
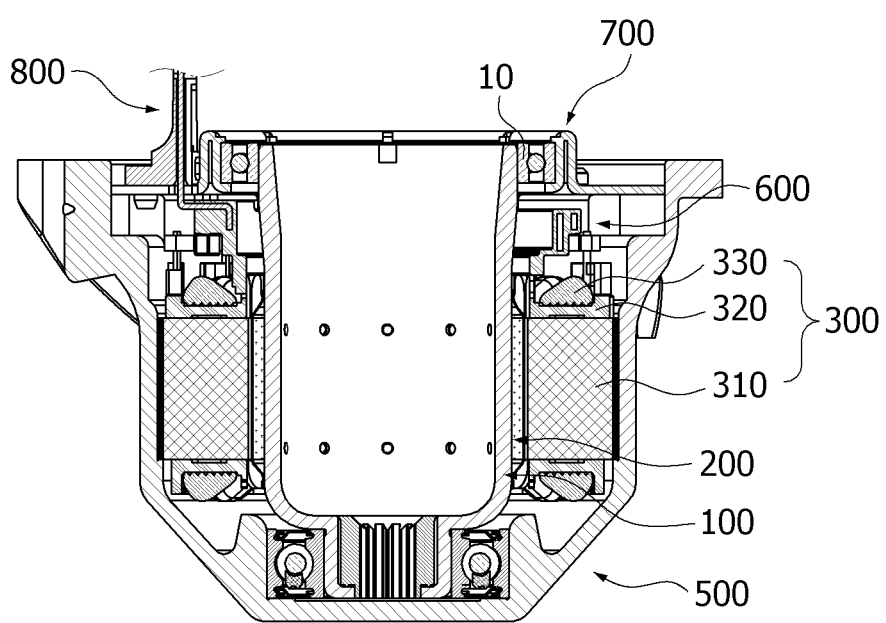
FIG. 1 is a view illustrating a motor according to an embodiment.

FIG. 1 is a view illustrating a motor according to an embodiment.

Referring to FIG. 1, the motor according to the embodiment may include a shaft 100, magnets 200, a stator 300, a guide part 400, a housing 500, and a busbar 600. Hereinafter, the term "inward" refers to a direction from a housing 500 toward the shaft 100 in a radial direction, and the term "outward" refers to a direction opposite to "inward." Hereinafter, a circumferential direction and a radial direction are defined based on an axial center of the motor.

The shaft 100 may be a hollow type member of which one side is open. In an axial direction, both ends of the shaft 100 may be rotatably supported by bearings. In the shaft 100, portions of which outer diameters are different from each other may be disposed to be divided in the axial direction.

The magnets 200 are in contact with an outer circumferential surface of the shaft 100. The magnets 200 rotate in conjunction with rotation of the shaft 100. The plurality of magnets 200 may be provided.

The stator 300 is disposed outside the shaft 100 and the magnets 200. The stator 300 may include a stator core 310, insulators 320 installed on the stator core 310, and coils 330 wound around the insulators 320. The coils 330 generate magnetic fields. The stator core 310 may be formed as one member or a combined plurality of divided cores. In addition, the stator core 310 may be formed in a form in which a plurality of thin steel plates are stacked but is not limited thereto. For example, the stator core 310 may also be formed as one single core.

The guide part 400 (see FIG. 2) fixes the magnets 200 to the shaft 100. In a state in which the guide part 400 fixes the magnets 200, the guide part 400 and the magnets 200 may be overmolded or surrounded by an additional can or contact member.

The housing 500 may be disposed outside the stator 300. The housing 500 may be a cylindrical member of which an upper portion is open. The shaft 100, the magnets 200, and the stator 300 are accommodated in the housing 500. In addition, the housing 500 may accommodate the bearings which support the shaft 100.

The busbar 600 is disposed above the stator 300. The busbar 600 connects the coils 330 wound around a core of the stator 300.

Figure 2:
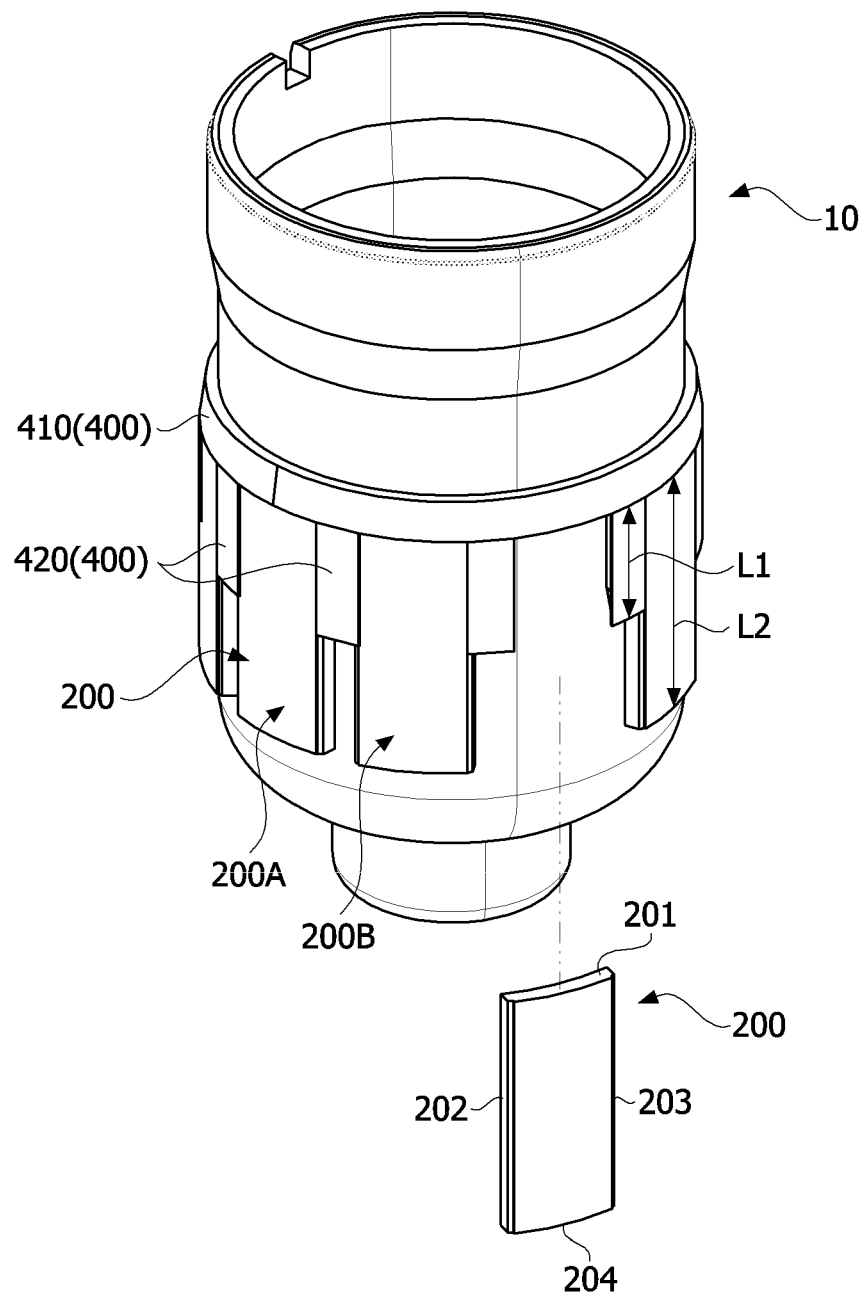
FIG. 2 is a perspective view illustrating a shaft on which a guide part according to a first embodiment is disposed and magnets.
Figure 3:
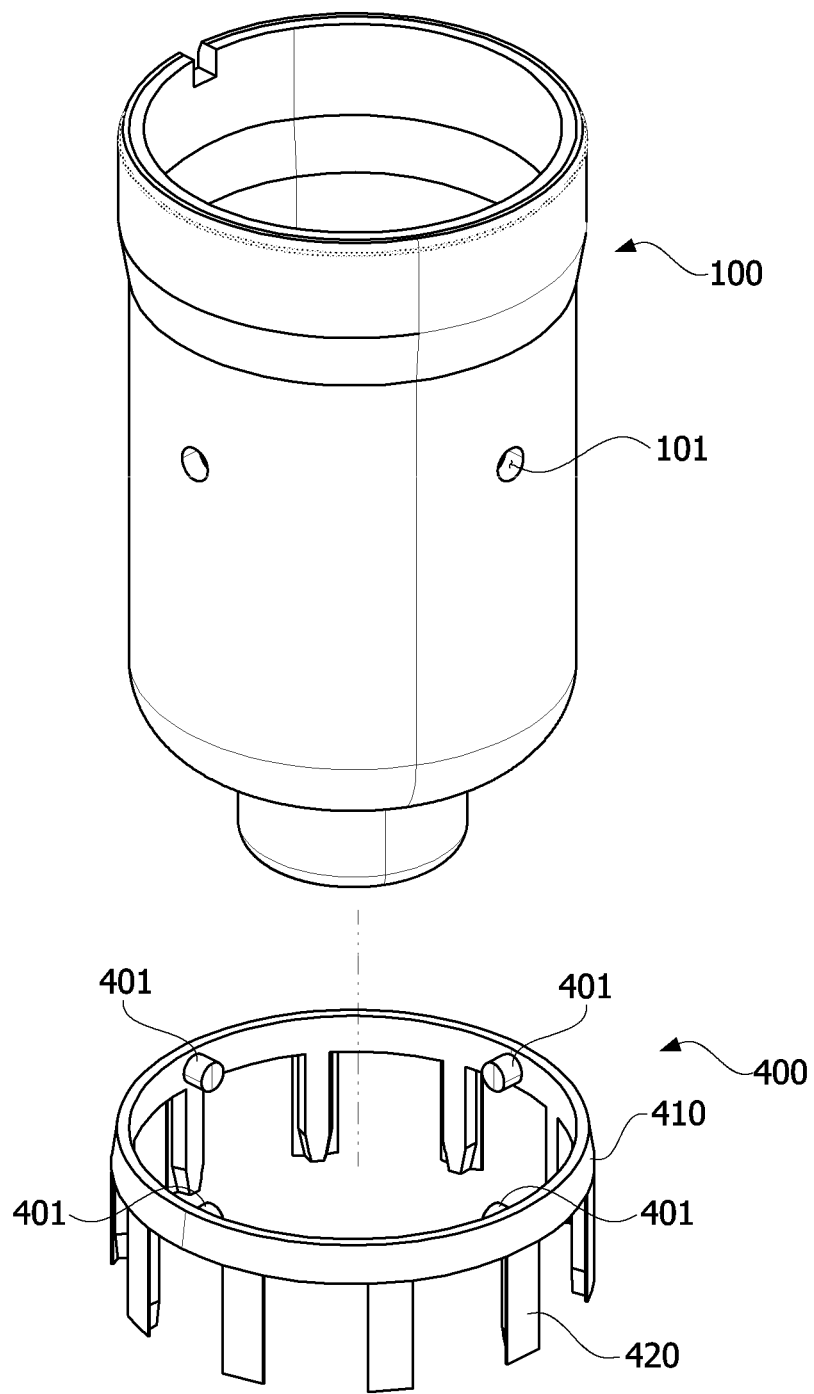
FIG. 3 is a perspective view illustrating the guide part and the shaft illustrated in FIG. 2.

FIG. 2 is a perspective view illustrating a shaft on which a guide part according to a first embodiment is disposed and magnets, and FIG. 3 is a perspective view illustrating the guide part and the shaft illustrated in FIG. 2.

Referring to FIGS. 2 and 3, a guide part 400 fixes magnets 200 to a shaft 100. The guide part 400 may be fixed to the shaft 100 first, and the magnets 200 may be fixed to the shaft 100 along the guide part 400. A material of the shaft 100 and a material of the guide part 400 are different from each other.

The guide part 400 may include a first guide 410 and second guides 420. The first guide 410 may be disposed on a side surface of the shaft 100. The second guides 420 may extend from the first guide 410 in an axial direction. The plurality of second guides 420 may be disposed.

The first guide 410 may be an annular member. An inner circumferential surface of the first guide 410 may be in contact with an outer circumferential surface of the shaft 100. An adhesive may be applied between the inner circumferential surface of the first guide 410 and the outer circumferential surface of the shaft 100. The shaft 100 may include one region and the other region which are divided in the axial direction and have different outer diameters, and the first guide may be disposed on an outer circumferential surface of the one region of which the outer diameter is relatively small.

The plurality of second guides 420 may be disposed at predetermined distances in a circumferential direction of the first guide 410. Meanwhile, the magnets 200 may be formed as a plurality of unit magnets 200A and 200B. The number of the second guides 420 may be the same as the number of the unit magnets 200A and 200B.

The first guide 410 may include one protrusion 401 or a plurality of protrusions 401. The protrusions 401 protrude inward from the inner circumferential surface of the first guide 410. The protrusions 401 may be cylindrical members. The shaft 100 may include one hole 101 or a plurality of holes 101 formed to pass through an inner surface and an outer surface of the shaft 100. The protrusions 401 may be disposed to be inserted into the holes 101. The protrusions 401 and the holes 101 are coupled to prevent the first guide 410 from being separated from or slipping on the shaft 100.

Figure 4:
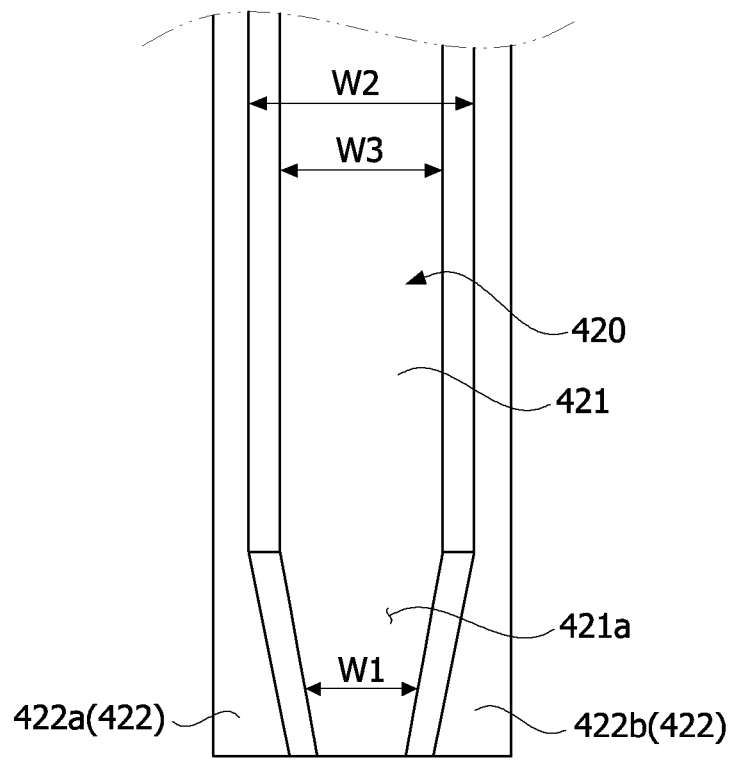
FIG. 4 is a view illustrating a second guide of the guide part.
Figure 5:
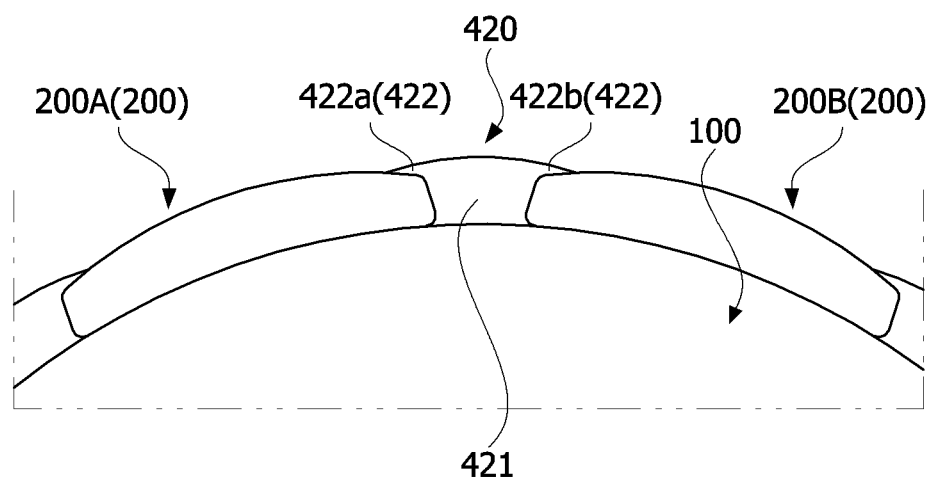
FIG. 5 is a view illustrating a second guide disposed between a first unit magnet and a second unit magnet.

FIG. 4 is a view illustrating the second guide 420 of the guide part 400, and FIG. 5 is a view illustrating the second guide 420 disposed between the first unit magnet 200A and the second unit magnet 200B.

FIG. 4 is a view illustrating the second guide 420 from the inside in a radial direction. Referring to FIGS. 4 and 5, the second guides 420 are disposed on side surfaces 202 and 203 of the magnets 200. For example, the second guide 420 may be disposed between the first unit magnet 200A and the second unit magnet 200B in the circumferential direction.

The second guide 420 may include a body 421 and an extension part 422 extending from the body 421. The body 421 may be in contact with the outer circumferential surface of the shaft 100. The extension part 422 is in contact with a part of an outer side surface of the magnet 200 and prevents the magnet 200 from being separated in the radial direction. For example, the extension part 422 may include a first extension part 422a and a second extension part 422b. The first extension part 422a may be disposed to extend from one side surface of the body 421 in the circumferential direction. The second extension part 422b may be disposed to extend from the other side surface of the body 421. The body 421 may become thicker from one side in contact with the shaft 100 toward the other side not in contact with the shaft. The first extension part 422a may be in contact with a part of the first unit magnet 200A. In addition, the second extension part 422b may be in contact with a part of the second unit magnet 200B. In addition, ends of the first extension part 422a and the second extension part 422b may be thinner than a portion extending from the body. In addition, the first extension part 422a and the second extension part 422b may become thinner from the body toward the ends thereof.

An end portion 421a of the body 421 may have a tapered shape of which a width W1 decreases toward an end thereof in the axial direction. The end portion 421a corresponds to an entrance through which the magnet 200 is inserted. Accordingly, the end portion 421a having the tapered shape guides the magnet 200 to be easily inserted along the second guide 420.

In addition, a width W2 of the body 421 at a side of the extension part 422 may be greater than a width W3 of the body 421 at an end side in contact with the shaft 100 in the radial direction.

Referring to FIG. 2, a length L1 of the second guide 420 may be smaller than a length L2 of the magnet 200 in the axial direction. Even when the length L1 of the second guide 420 is shorter than the length L2 of the magnet 200, there is no problem for guiding and aligning the magnet 200 to and at an exact position. In addition, since the length L1 of the second guide 420 is relatively short, there is an advantage in that an insertion space of the magnet 200 is sufficiently secured at a side of the end portion 421a of the second guide 420.

When the magnet 200 is inserted along the second guide 420, one side surface 202 of the magnet 200 may be in contract with the second guide 420 at one side, the other side surface 203 of the magnet 200 may be in contact with the second guide 420 at the other side, and one end surface 201 of the magnet 200 may be in contact with the first guide 410. The other end surface 204 of the magnet 200 may not be in contact with the guide part 400. An adhesive may be applied between the magnet 200 and the outer circumferential surface of the shaft 100. The magnet 200 may have a shape of which a thickness in the radial direction decreases from a width center in the circumferential direction toward the outer side surface thereof.

The guide part 400 may be integrally molded with the shaft 100 in an insert-injection manner. The guide part 400 may be formed of a plastic material.

Figure 6:
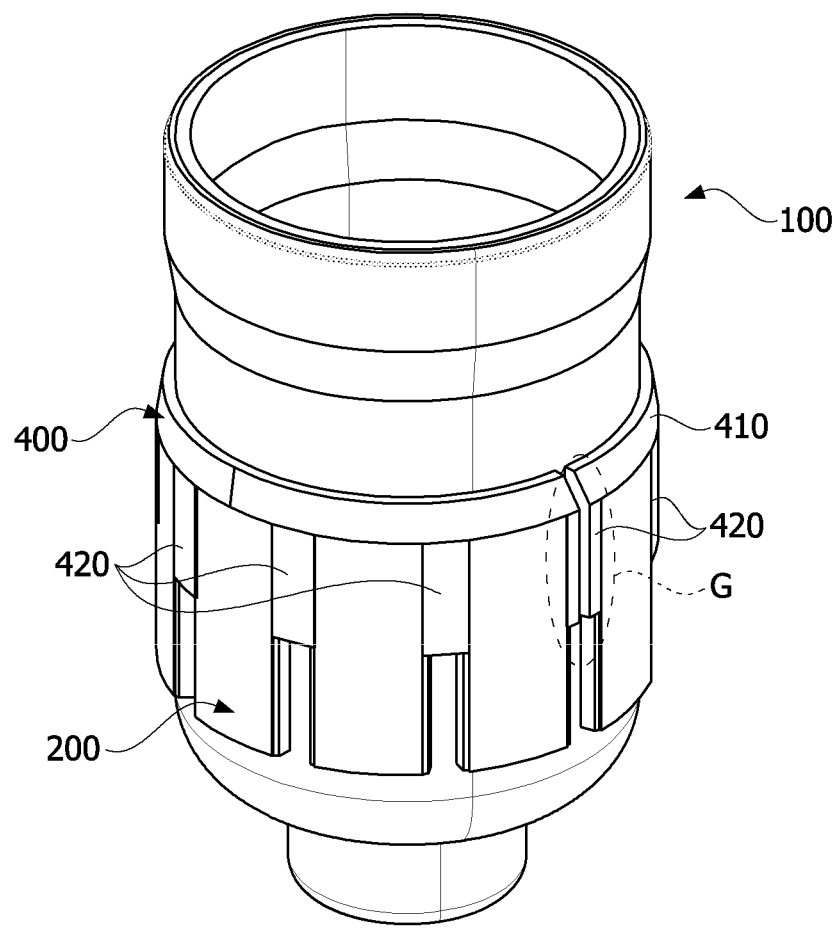
FIG. 6 is a perspective view illustrating a shaft on which a guide part according to a second embodiment is disposed and magnets.
Figure 7:
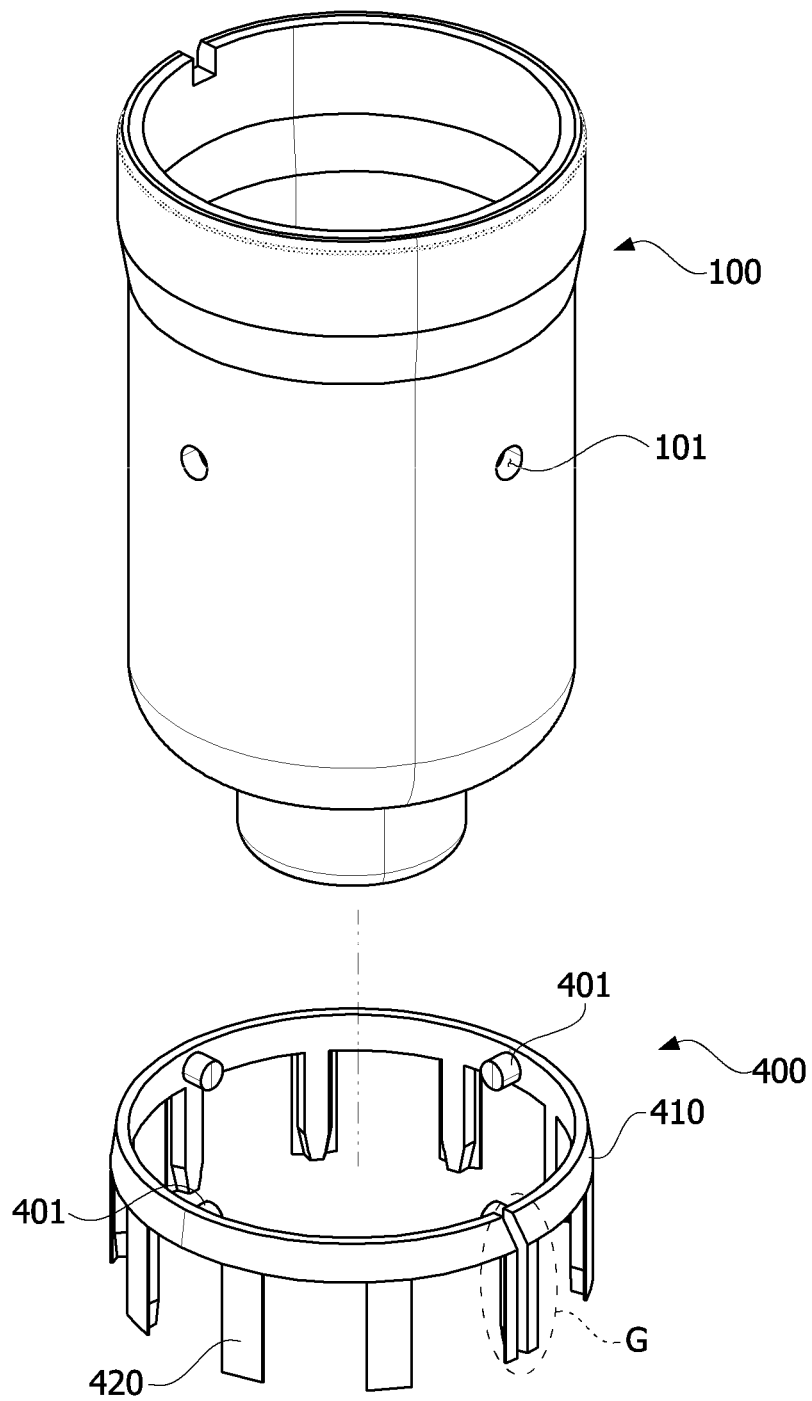
FIG. 7 is a perspective view illustrating the guide part and the shaft illustrated in FIG. 6.

FIG. 6 is a perspective view illustrating a shaft 100 on which a guide part 400 according to a second embodiment is disposed and magnets 200, and FIG. 7 is a perspective view illustrating the guide part 400 and the shaft 100 illustrated in FIG. 6.

Referring to FIGS. 6 and 7, the guide part 400 according to the second embodiment has the same configuration as the guide part 400 according to the first embodiment excluding components which will be described below.

Unlike the guide part 400 according to the first embodiment, in the guide part 400 according to the second embodiment, the shaft 100 and the guide part 400 may correspond to separate components, and the guide part 400 may be assembled to the shaft 100.

The first guide 410 may be formed in a ring type member, and a gap G may be formed between both ends of the first guide 410. Second guides 420 may be disposed near both ends of the first guide 410. Among the plurality of second guides 420, a gap G may also be formed between the second guides 420 disposed near both ends of the first guide 410. In order to fix the magnets 200, the gap G may be formed in a region in which the second guides 420 are positioned in a circumferential direction.

Sizes of the second guides 420 disposed near both ends of the first guide 410 may be smaller than sizes of the other second guides 420. For example, the second guides 420 disposed near both ends of the first guide 410 may have the same lengths as the other second guides 420 but have smaller widths than the other second guides 420 in the circumferential direction.

The guide part 400 may be formed of an elastically deformable plastic material. The guide part 400 may be deformed to widen the gap G and assembled to an outer circumferential surface of the shaft 100. In an assembly process, when protrusions 401 disposed on the first guide 410 are inserted into holes 101 of the shaft 100, a position of the guide part 400 is arranged.

Figure 8:
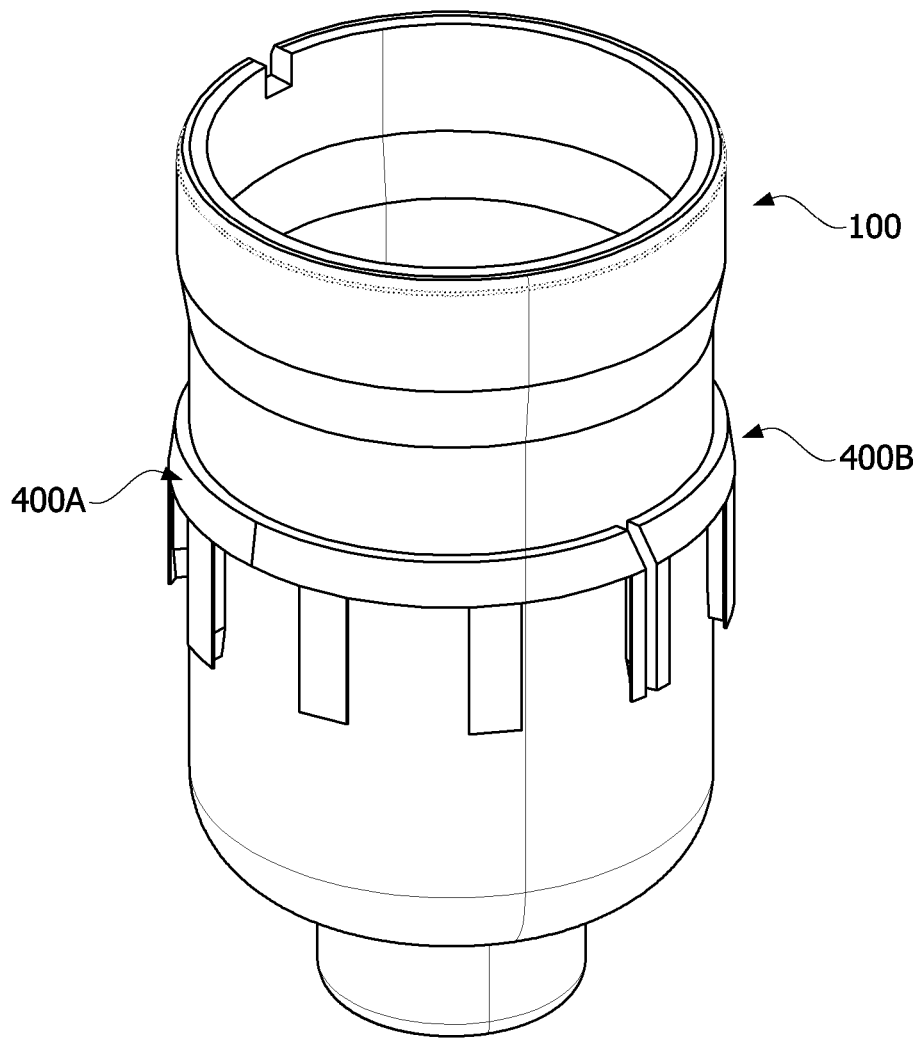
FIG. 8 is a perspective view illustrating a shaft on which a guide part according to a third embodiment is disposed and magnets.
Figure 9:
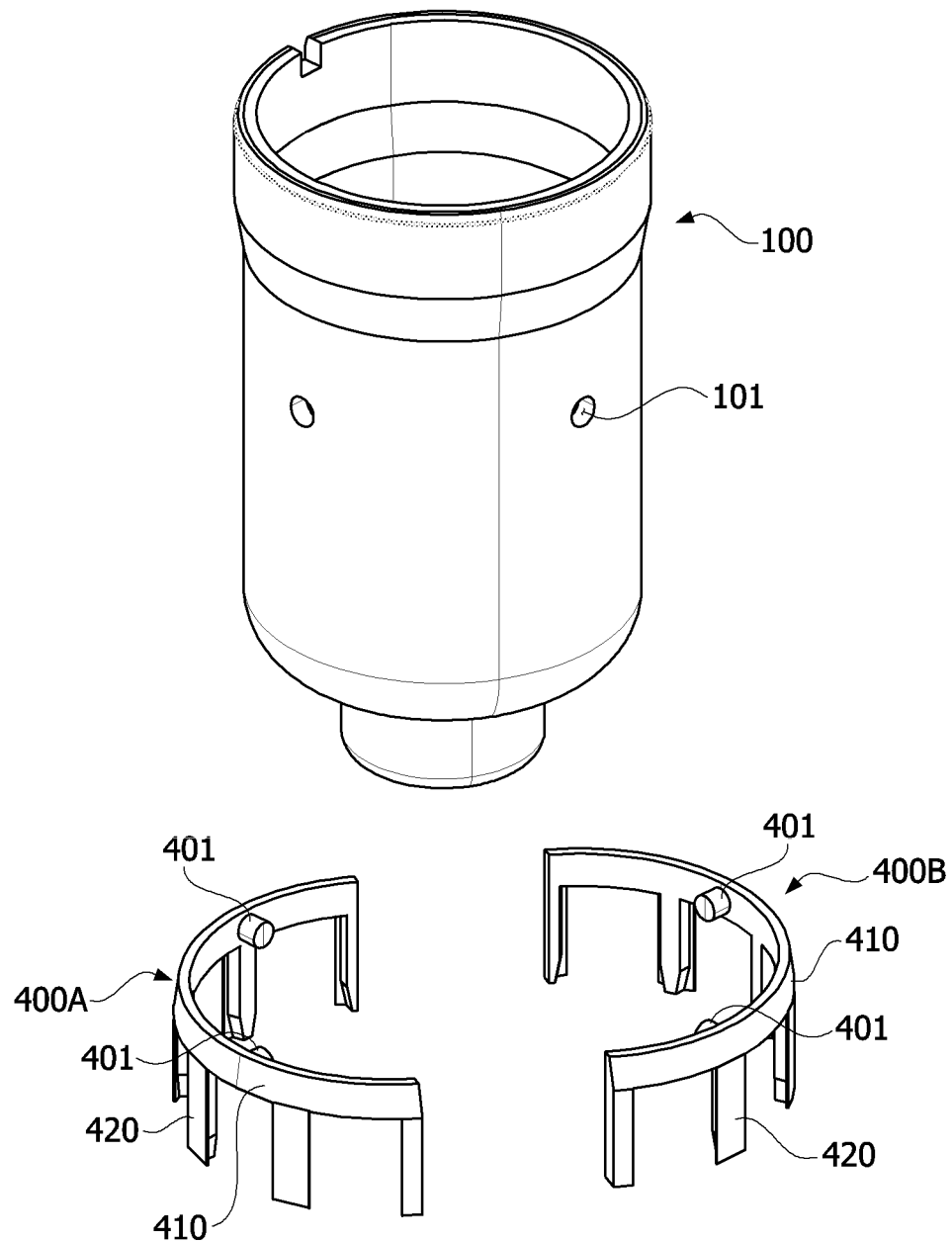
FIG. 9 is a perspective view illustrating the guide part and the shaft illustrated in FIG. 8.

FIG. 8 is a perspective view illustrating a shaft 100 on which a guide part 400 according to a third embodiment is disposed and magnets 200, FIG. 9 is a perspective view illustrating the guide part 400 and the shaft 100 illustrated in FIG. 8.

Referring to FIGS. 8 and 9, the guide part 400 according to the third embodiment has the same configuration as the guide part 400 according to the first embodiment excluding components which will be described below.

Unlike the guide part 400 according to the first embodiment, in the guide part 400 according to the third embodiment, the shaft 100 and the guide part 400 may be separate components, and the guide part 400 may be assembled to the shaft 100. In addition, unlike the guide part 400 formed as a single part according to the second embodiment, the guide part 400 according to the third embodiment is formed as a plurality of components.

The guide part 400 may include a first guide part 400A and a second guide part 400B. The first guide part 400A is coupled to one part of an outer circumferential surface of the shaft 100, and the second guide part 400B is coupled to the other part of the outer circumferential surface of the shaft 100. Since the guide part 400 is divided into the first guide part 400A and the second guide part 400B, there is an advantage in that assembly is easy. Each of the first guide part 400A and the second guide part 400B includes a first guide 410 and second guides 420.

The first guide part 400A and the second guide part 400B may have semicircular shapes. Each of the first guide part 400A and the second guide part 400B is assembled to the shaft 100. Protrusions 401 of the first guide part 400A and protrusions 401 of the second guide part 400B are inserted into holes 101 of the shaft 100. When the first guide part 400A and the second guide part 400B are assembled to the shaft 100, the first guide 410 of the first guide part 400A and the first guide 410 of the second guide part 400B may be positioned to be aligned in a circumferential direction, and the second guides 420 of the first guide part 400A and the second guides 420 of the second guide part 400B may also be positioned to be aligned in the circumferential direction.

The guide part 400 according to the third embodiment has an advantage in that assemblability of the guide part 400 is improved.

Figure 10:
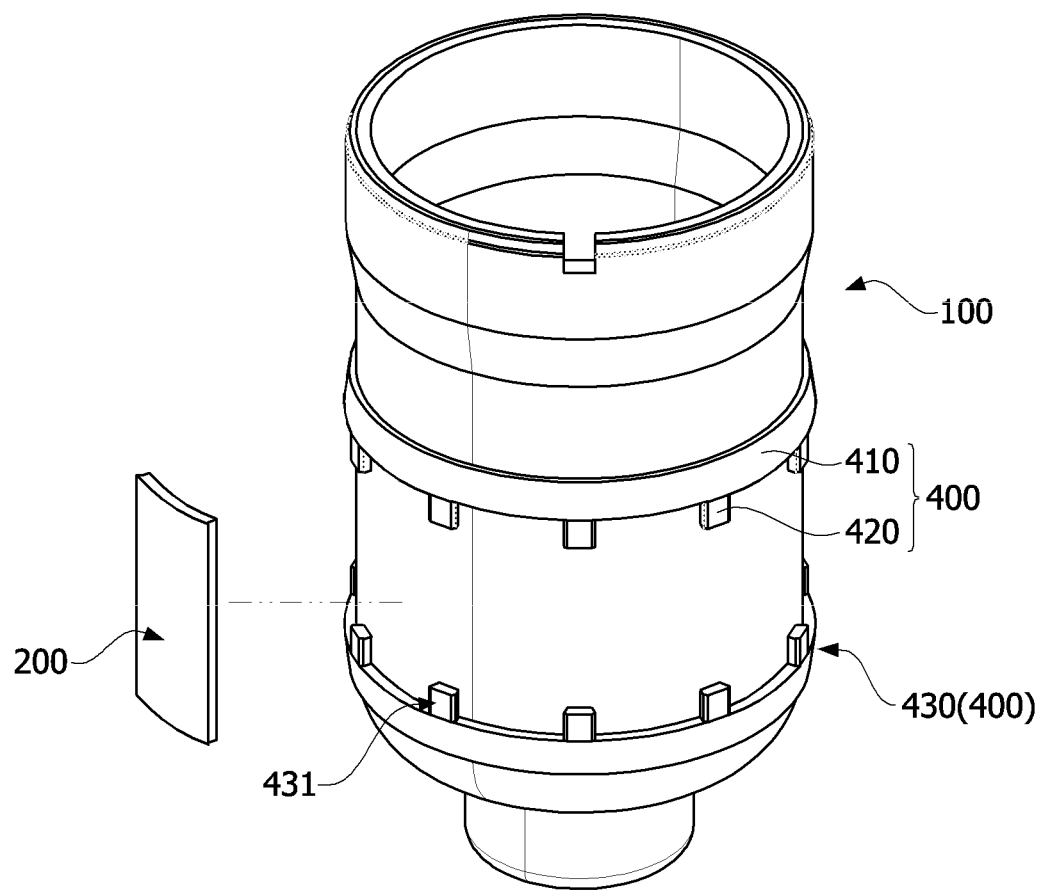
FIG. 10 is a perspective view illustrating a shaft on which a guide part according to a fourth embodiment is disposed and magnets.
Figure 11:
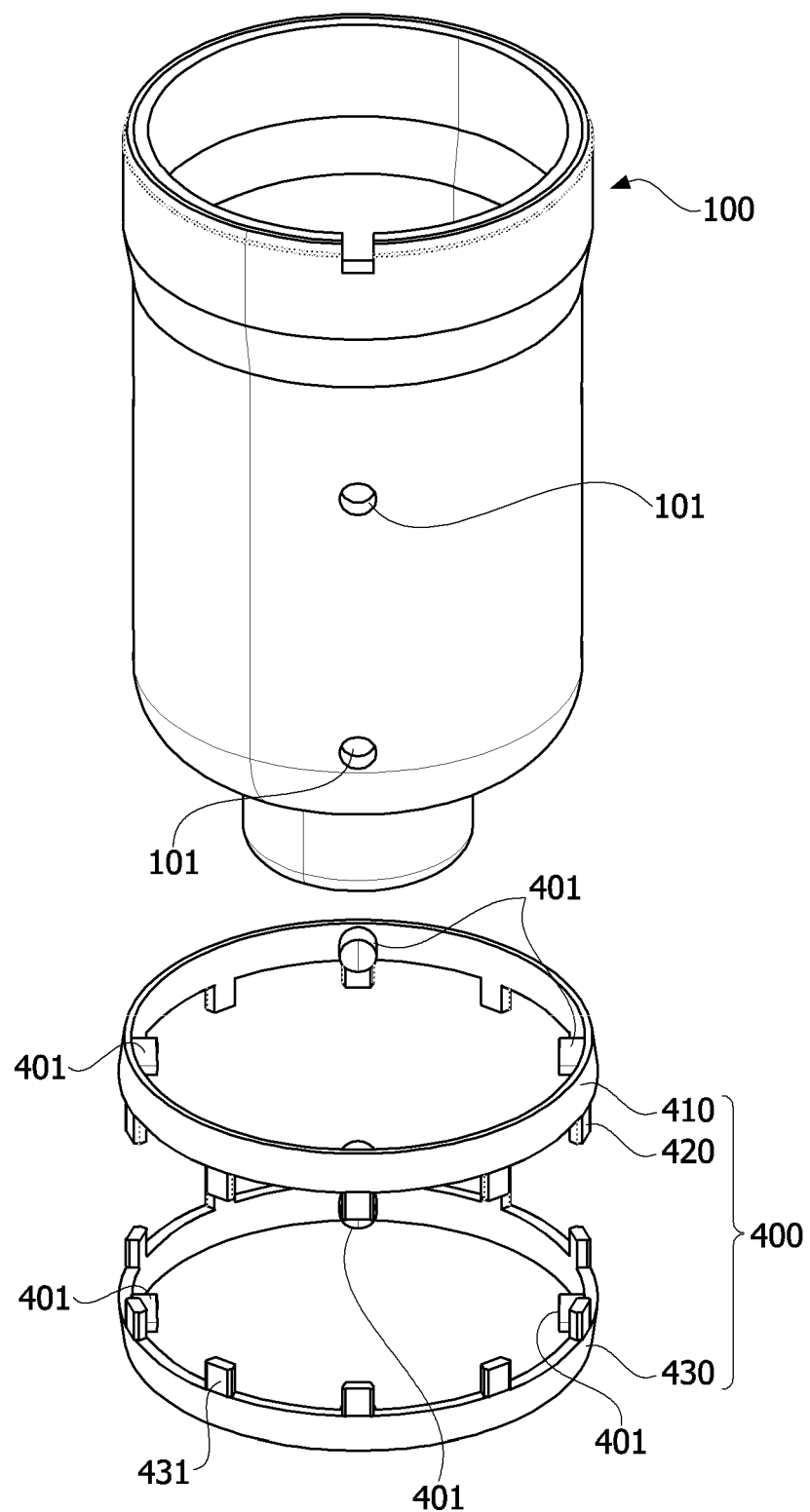
FIG. 11 is a perspective view illustrating the guide part and the shaft illustrated in FIG. 10.

FIG. 10 is a perspective view illustrating a shaft 100 on which a guide part 400 according to a fourth embodiment is disposed and magnets 200, and FIG. 11 is a perspective view illustrating the guide part 400 and the shaft 100 illustrated in FIG. 10.

Figure 12:
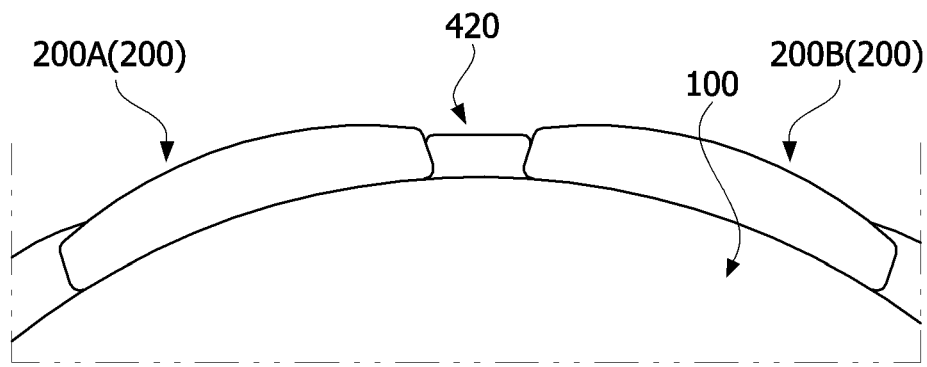
FIG. 12 is a view illustrating a state in which second guides of the guide part illustrated in FIG. 10 are disposed between a first unit magnet and a second unit magnet.

FIG. 12 is a view illustrating a state in which second guides 420 of the guide part 400 illustrated in FIG. 10 are disposed between a first unit magnet 200A and a second unit magnet 200B.

Referring to FIGS. 10 and 11, the guide part 400 according to the fourth embodiment has the same configuration as the guide part 400 according to the first embodiment excluding components which will be described below.

Unlike the guide part 400 according to the first embodiment, a third guide 430 is additionally disposed in the guide part 400 according to the fourth embodiment. The third guide 430 is formed as a guide separated from the first guide 410 and the second guides 420. The third guide 430 may be assembled to the shaft 100 to be spaced apart from the first guide 410 in an axial direction in consideration of a length of the magnet 200. When the magnet 200 is fixed to the shaft 100, a side surface of the magnet 200 may be in contact with the second guide 420, and one end surface of the magnet 200 may be in contact with the first guide 410. In addition, the other end surface of the magnet 200 may be in contact with the third guide 430.

A plurality of protruding parts 431 may be disposed to extend from the third guide 430. The plurality of protruding parts 431 are disposed at predetermined intervals in a circumferential direction. The protruding parts 431 may be in contact with both side surfaces of the magnet 200 like the second guide 420.

The second guides 420 and the protruding parts 431 do not cover an outer side surface of the magnet 200 and support only a side surface of the magnet 200. This is because the magnet 200 is installed on the shaft 100 in a radial direction. In order to secure a space into which the magnet 200 is inserted in the radial direction, components corresponding to the extension parts 422 of the guide part 400 according to the first embodiment are omitted in the second guides 420 and the protruding parts 431.

Since the third guide 430 firmly supports the other side end of the magnet 200, the guide part 400 according to the fourth embodiment has an advantage in that the magnet 200 is prevented from being moved and misaligned in the axial direction.

The guide part 400 according to the fourth embodiment may be integrally molded with the shaft 100 in an insert-injection manner.

Figure 13:
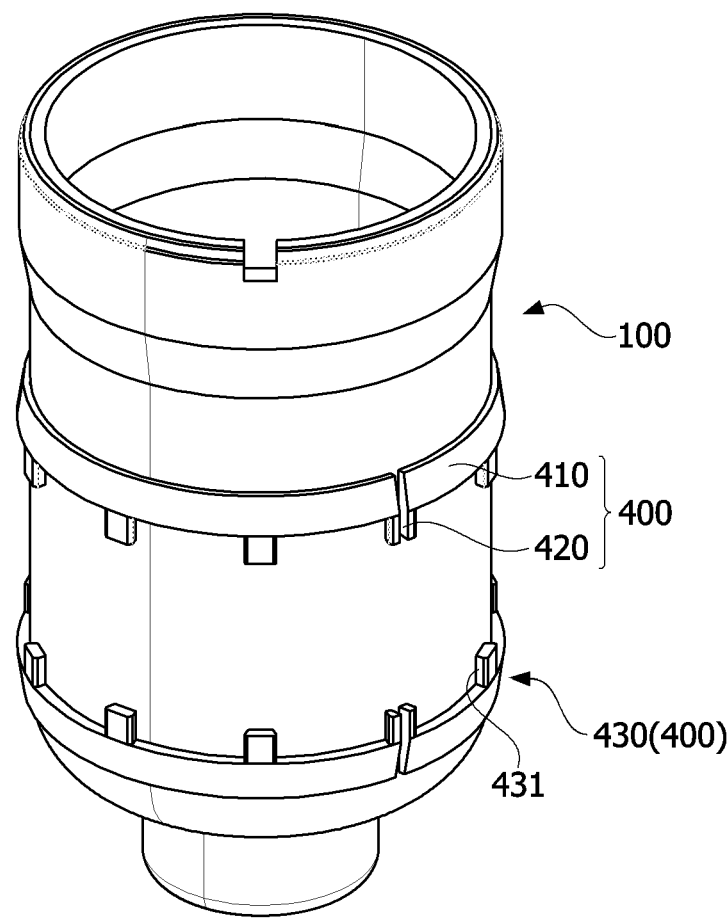
FIG. 13 is a perspective view illustrating a shaft on which a guide part according to a fifth embodiment is disposed and magnets.
Figure 14:
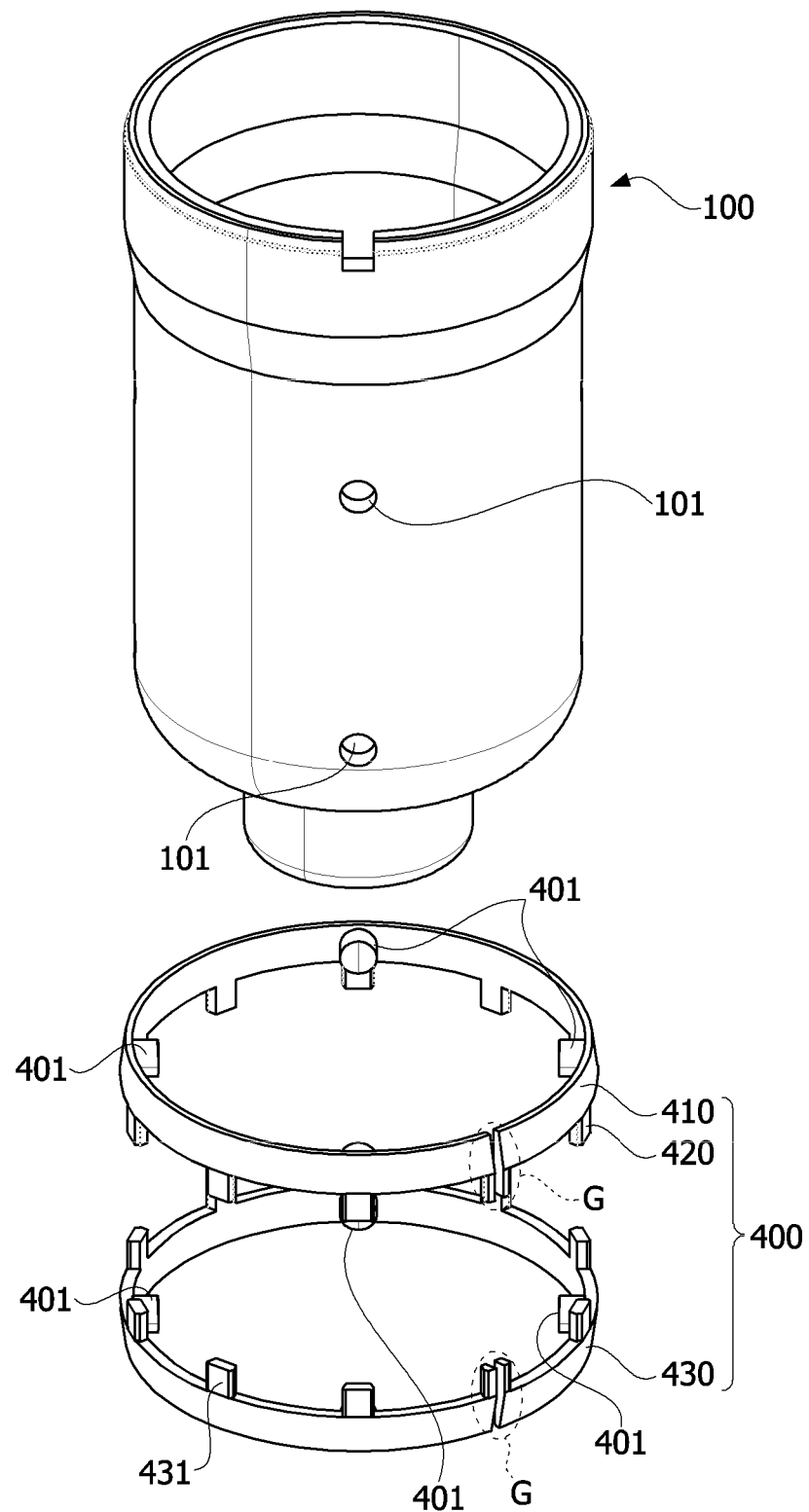
FIG. 14 is a perspective view illustrating the guide part and the shaft illustrated in FIG. 13.

FIG. 13 is a perspective view illustrating a shaft 100 on which a guide part 400 according to a fifth embodiment is disposed and magnets 200, and FIG. 14 is a perspective view illustrating the guide part 400 and the shaft 100 illustrated in FIG. 13.

Referring to FIGS. 13 and 14, the guide part 400 according to the fifth embodiment has the same configuration as the guide part 400 according to the fourth embodiment excluding components which will be described below.

Unlike the guide part 400 according to the fourth embodiment, in the guide part 400 according to the fifth embodiment, the shaft 100 and the guide part 400 may be separate components, and the guide part 400 may be assembled to the shaft 100.

A first guide 410 may be formed as a ring type member, and a gap G may be formed between both ends of the first guide 410. Second guides 420 may be disposed near both ends of the first guide 410. Among the plurality of second guides 420, a gap G may also be formed between the second guides 420 disposed near both ends of the first guide 410. In order to fix the magnet 200, the gap G may be formed in a region in which a second guide 420 is positioned in a circumferential direction.

A third guide 430 may also be formed as a ring type member, and a gap G may be formed between both ends of the third guide 430. Protruding parts 431 may be disposed near both ends of the third guide 430. The third guide 430 may also include protrusions 401 which are inserted into holes 101 of the shaft 100.

The guide part 400 may be formed of an elastically deformable plastic material. The guide part 400 may be deformed to widen the gap G and assembled to an outer circumferential surface of the shaft 100. In an assembly process, when the protrusions 401 are inserted into the holes 101 of the shaft 100, a position of the guide part 400 is arranged.

Figure 15:
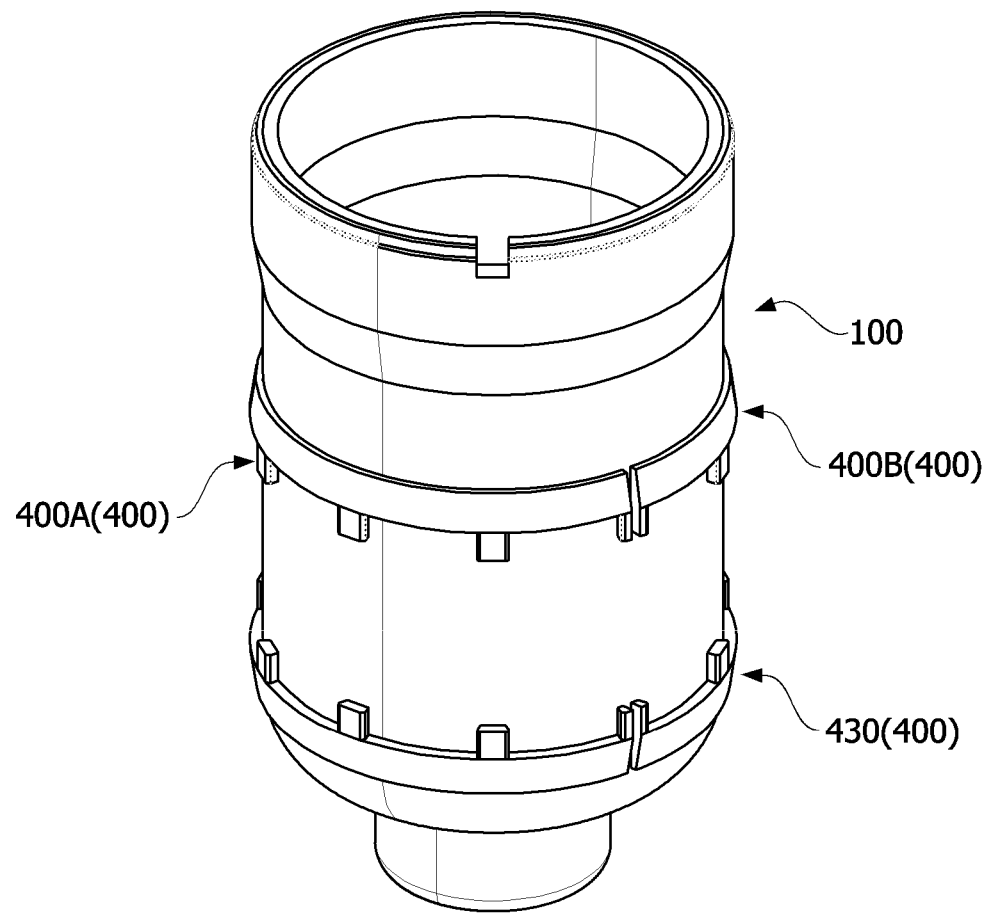
FIG. 15 is a perspective view illustrating a shaft on which a guide part according to a sixth embodiment is disposed and magnets.
Figure 16:
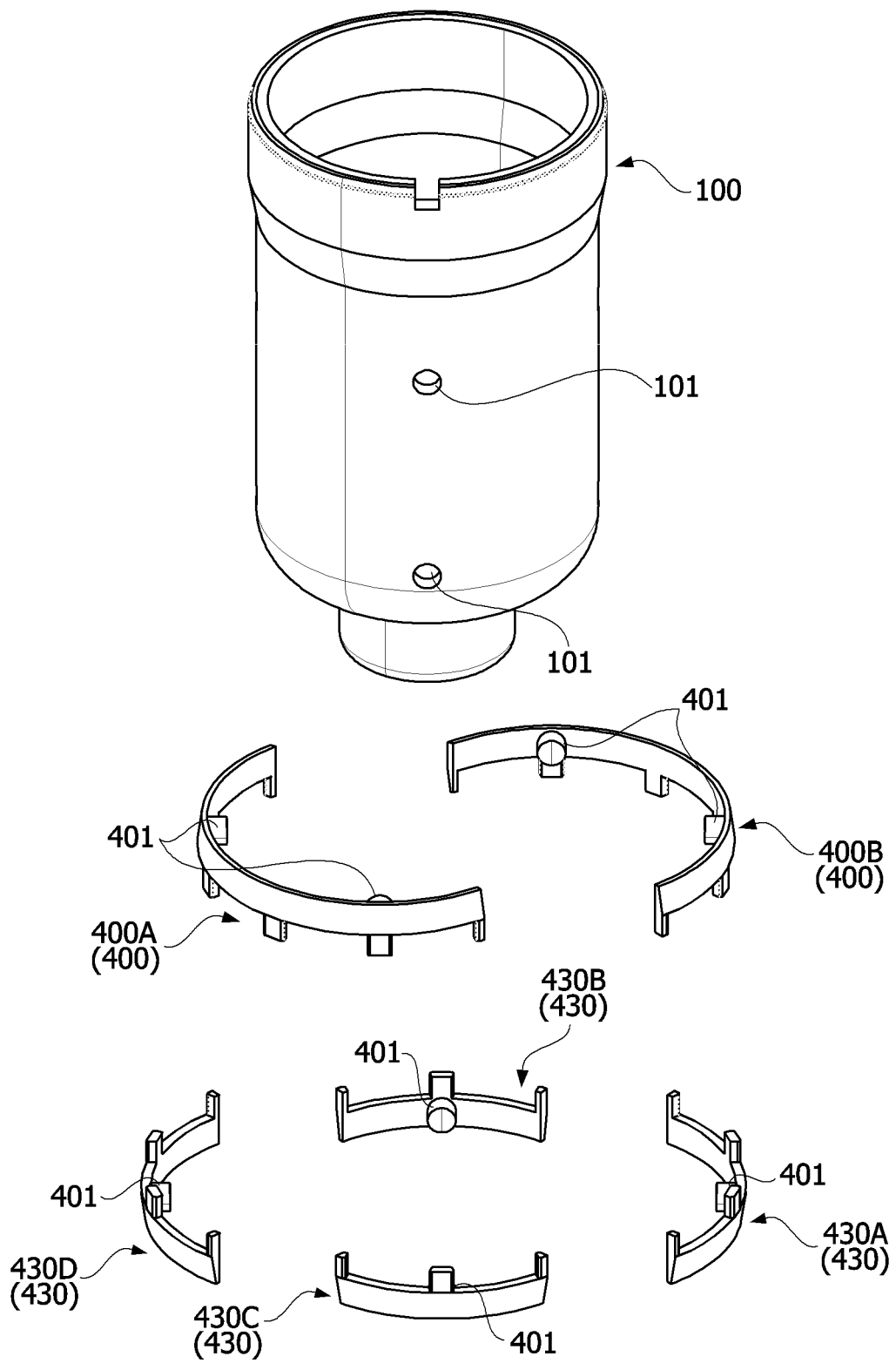
FIG. 16 is a perspective view illustrating the guide part and the shaft illustrated in FIG. 15.

FIG. 15 is a perspective view illustrating a shaft 100 on which a guide part 400 according to a sixth embodiment is disposed and magnets 200, and FIG. 16 is a perspective view illustrating the guide part 400 and the shaft 100 illustrated in FIG. 15.

Referring to FIGS. 15 and 16, the guide part 400 according to the sixth embodiment has the same configuration as the guide part 400 according to the fourth embodiment excluding components which will be described below.

Unlike the guide part 400 according to the fourth embodiment, in the guide part 400 according to the sixth embodiment, the shaft 100 and the guide part 400 may be separate components, and the guide part 400 may be assembled to the shaft 100. In addition, unlike the guide part 400 formed as a single part according to the fifth embodiment, the guide part 400 according to the sixth embodiment is formed as a plurality of components.

The guide part 400 may include a first guide part 400A and a second guide 400B.

In addition, a third guide 430 may also be formed as a plurality of components. For example, the third guide 430 may be formed as a 3-1 guide 430A, a 3-2 guide 430B, a 3-3 guide 430C, and a 3-4 guide 430D. The 3-1 guide 430A, the 3-2 guide 430B, the 3-3 guide 430C, and the 3-4 guide 430D may be arc members.

Each of the 3-1 guide 430A, the 3-2 guide 430B, the 3-3 guide 430C, and the 3-4 guide 430D is assembled to the shaft 100. Protrusions 401 of the third guide 430 are inserted into holes 101 of the shaft 100. When each of the 3-1 guide 430A, the 3-2 guide 430B, the 3-3 guide 430C, and the 3-4 guide 430D is assembled to the shaft 100, the 3-1 guide 430A, the 3-2 guide 430B, the 3-3 guide 430C, and the 3-4 guide 430D may be positioned to be aligned in a circumferential direction.

The guide part 400 according to the sixth embodiment supports the other end surface of the magnet 200 and also has an advantage in that assemblability of the guide part 400 is improved.

Figure 17:
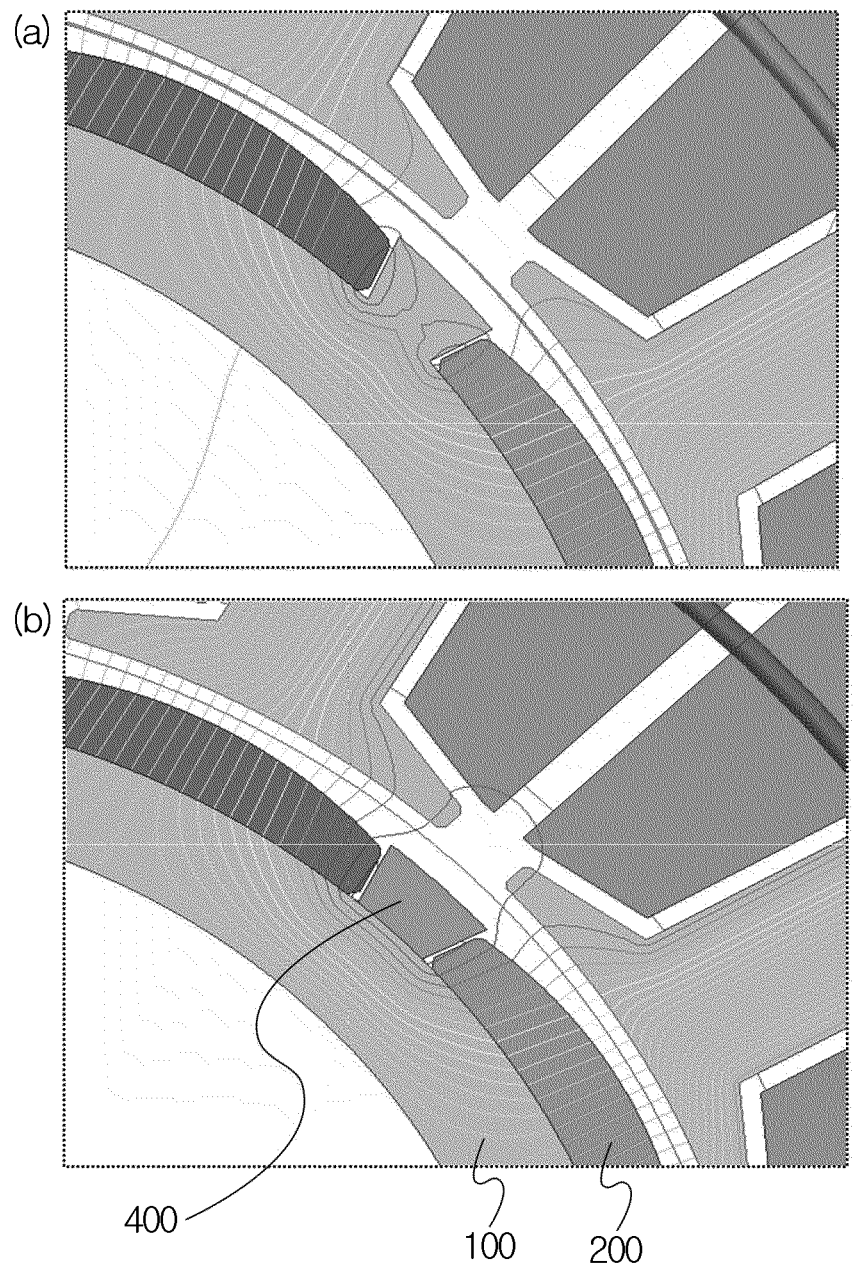
FIG. 17 is a set of views in which a magnetic flux of a motor of a embodiment including a guide part formed of a plastic material and a magnetic flux of a motor according to an comparative example including a guide part formed of a steel material are compared.

FIG. 17 is a set of views in which a magnetic flux of a motor of a comparative example including a guide part formed of a plastic material and a magnetic flux of a motor according to an embodiment including a guide part formed of a steel material are compared.

FIG. 17A is a view illustrating a magnetic flux near a guide part 400 formed of a steel material, and FIG. 17B is a view illustrating a magnetic flux near a guide part 400 of a motor according to the embodiment, wherein the guide part 400 is formed of a plastic material.

As illustrated in FIG. 17A, a magnetic flux leaks through the guide part formed of the steel material. However, as illustrated in FIG. 17B, it can be seen that a magnetic flux does not leak through the guide part 400 formed of the plastic material. As a result of measuring a maximum torque, in the case of the comparative example, a measured maximum torque is 3.36 Nm, and in the case of an example, a measured maximum torque is 3.60 Nm. Accordingly, it is seen that the performance of the motor of the example is relatively superior when compared to the comparative example.

Figure 18:
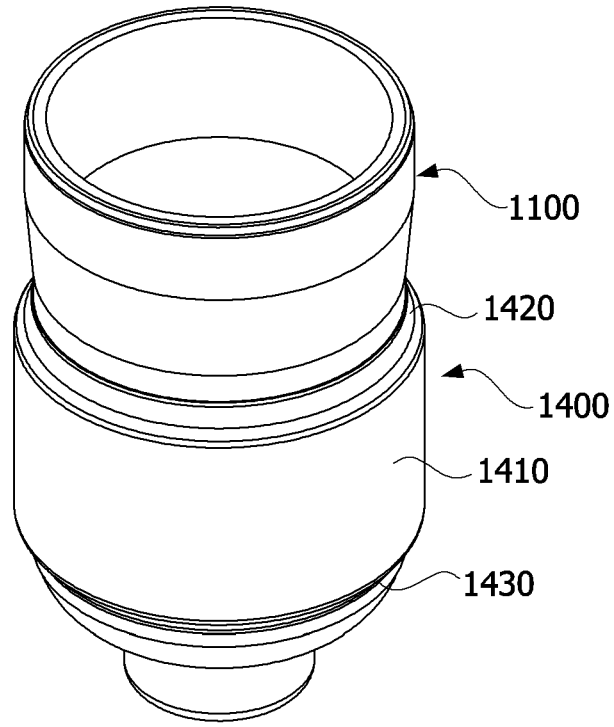
FIG. 18 is a view illustrating a shaft on which a cover of a motor according to another embodiment is disposed.
Figure 19:
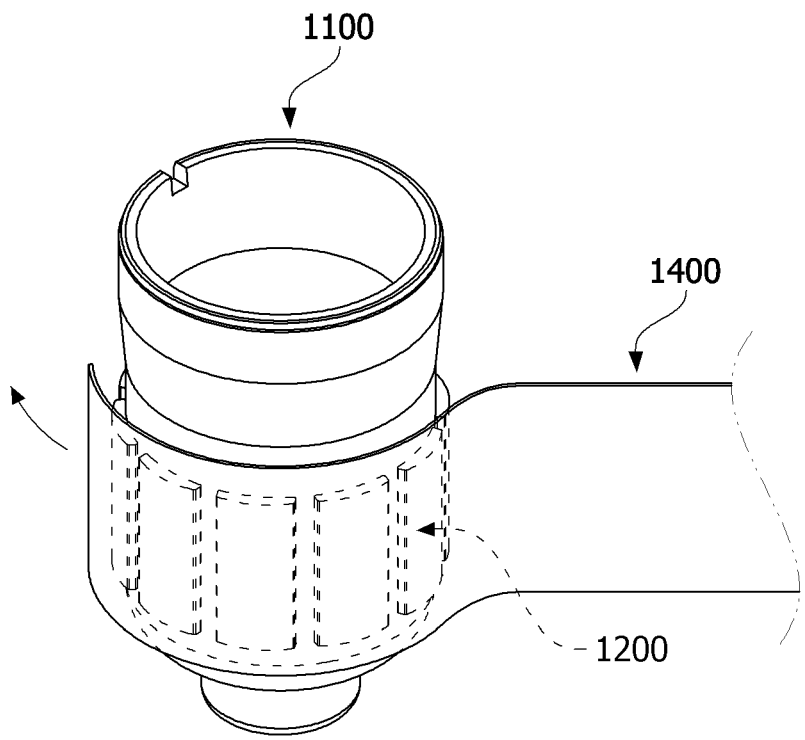
FIG. 19 is a view illustrating a state in which magnets disposed on an outer circumferential surface of a shaft are being surrounded by the cover.

FIG. 18 is a view illustrating a shaft 1100 on which a cover 1400 of a motor according to another embodiment is disposed, and FIG. 19 is a view illustrating a state in which magnets 200 disposed on an outer circumferential surface of the shaft 1100 are being surrounded by the cover 1400.

Referring to FIGS. 18 and 19, the cover 1400 may be an adhesive member which surrounds the magnets 1200 and fixes the magnets 1200 to the shaft 1100. For example, the cover 1400 may be a member in which a matrix is impregnated in reinforcing fiber.

The cover 1400 is a member in a semi-cured state and serves as an adhesive sheet which fixes the magnets 1200 to the shaft 1100. The reinforcing fiber may mainly correspond to carbon fiber, glass fiber, aramid fiber, or the like, and the matrix may correspond to an epoxy resin, a polyester resin, or a thermoplastic resin. The carbon fiber has mechanical characteristics of high tensile strength and high tensile elastic modulus and thermal characteristics of high heat and fire resistance. The glass fiber has mechanical characteristics of high tensile strength and a high tensile elastic modulus and thermal characteristics of a low coefficient of linear expansion. Both the carbon fiber and the glass fiber have superior electrical insulation properties.

In a state in which a part of the cover 1400 is in contact with the shaft 1100 and the magnets 1200, when the shaft 1100 rotates, since the cover 1400 may naturally surround the magnets 1200 and may be wound around the shaft 1100, there are advantages in that a process is simple and is quickly performed.

The cover 1400 may include a first part 1410, a second part 1420, and a third part 1430 divided in an axial direction. The second part 1420 extends from one side of the first part 1410. The third part 1430 extends from the other side of the first part 1410.

The first part 1410 is a portion which covers the magnets 1200, and the second part 1420 and the third part 1430 are portions in contact with the shaft 1100.

Figure 20:
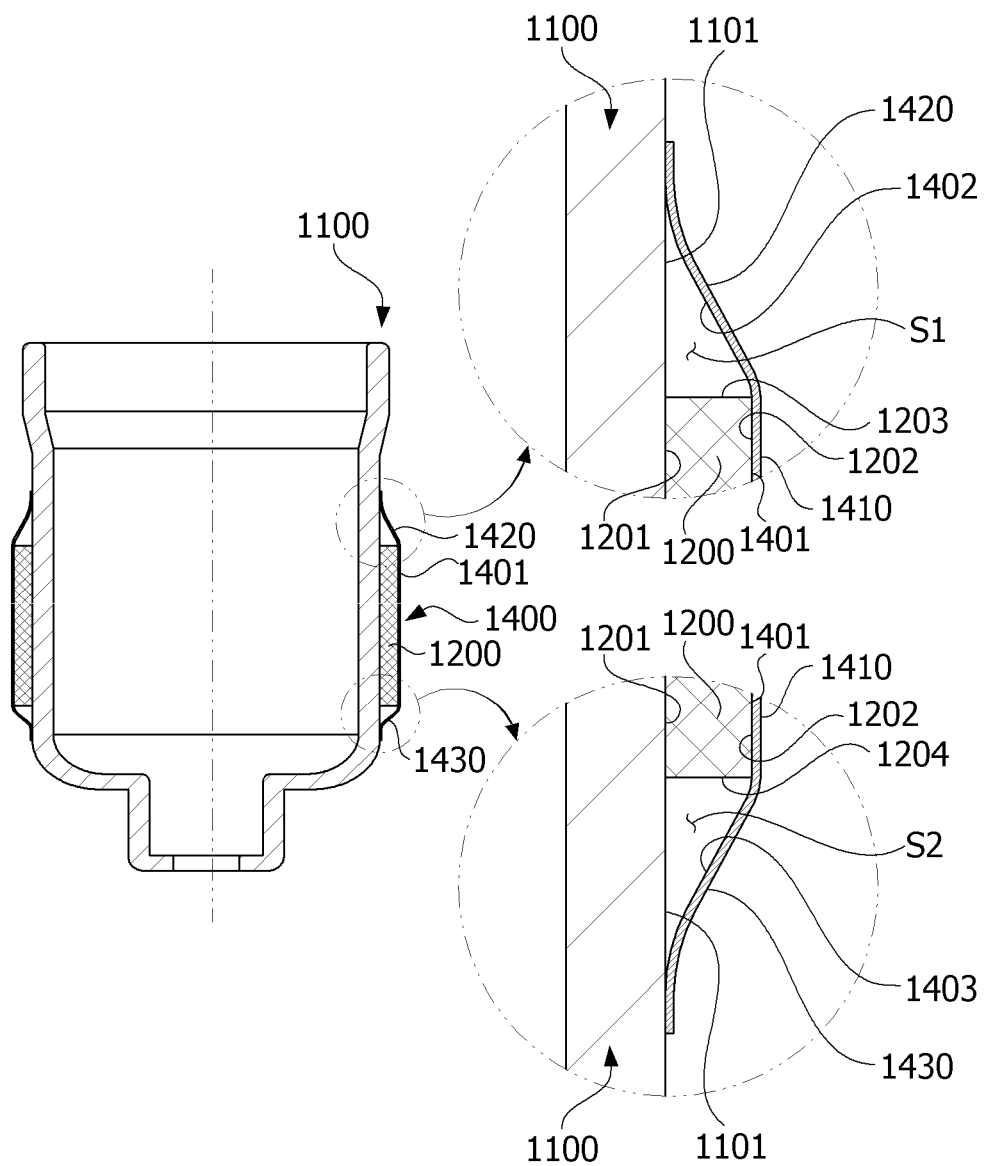
FIG. 20 is a side cross-sectional view illustrating the shaft, the magnets, and the cover.

FIG. 20 is a side cross-sectional view illustrating the shaft 1100, the magnets 1200, and the cover 1400.

Referring to FIG. 20, an inner surface of the magnet 1200 is in contact with an outer surface of the shaft 1100. In addition, an outer surface of the magnet 1200 is in contact with an inner surface 1401 of the first part 1410. A part of an inner surface 1402 of the second part 1420 is in contact with the outer surface of the shaft 1100, and the remaining part of the inner surface 1402 of the second part 1420 is disposed apart from the outer surface of the shaft 1100. A space S1 is formed between the outer surface of the shaft 1100, one end surface of the magnet 1200, and the inner surface 1402 of the second part 1420.

In addition, a part of an inner surface 1403 of the third part 1430 is in contact with the outer surface of the shaft 1100, and the remaining part of the inner surface 1403 of the third part 1430 is disposed apart from the outer surface of the shaft 1100. A space S2 is formed between the outer surface of the shaft 1100, the other end surface of the magnet 1200, and the inner surface 1403 of the third part 1430.

Figure 21:
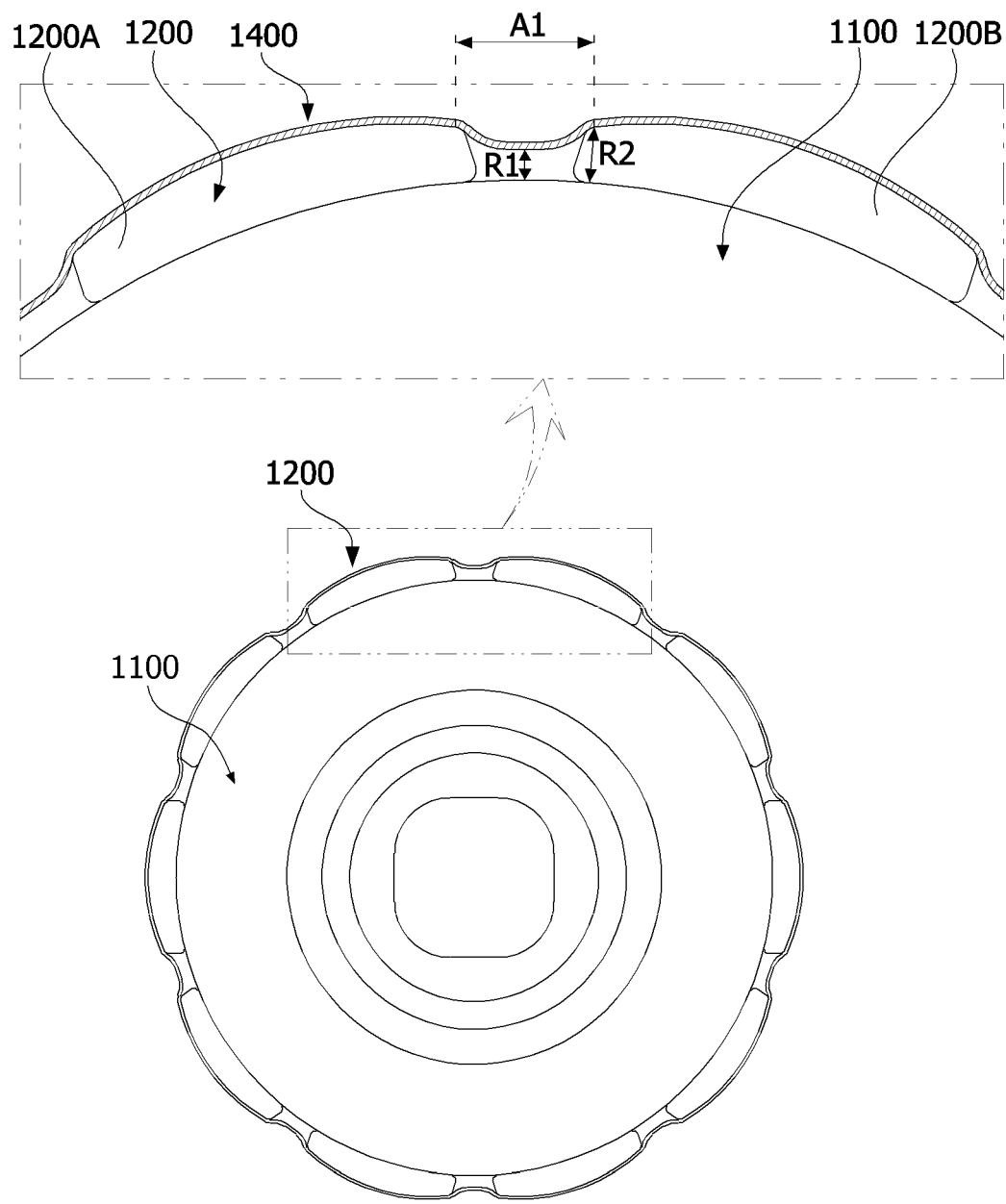
FIG. 21 is a plan cross-sectional view illustrating the shaft, the magnets, and the cover.

FIG. 21 is a plan cross-sectional view illustrating the shaft 1100, the magnets 1200, and the cover 1400.

Referring to FIG. 21, the cover 1400 may include a plurality of first regions A1. The plurality of first regions A1 may be disposed at predetermined intervals in a circumferential direction from an axial center. In the first region A1, a distance R1 from the outer surface of the shaft 1100 to the first region A1 in a radial direction is smaller than a minimum distance R2 from the outer surface of the shaft 1100 to the outer surface of the magnet 1200 in the radial direction. The minimum distance R2 from the outer surface of the shaft 1100 to the outer surface of the magnet 1200 in the radial direction may be determined based on a side end of the outer surface of the magnet 1200 in the circumferential direction in consideration of a bread shape of the outer surface of the magnet 1200.

The first region A1 is disposed between a first unit magnet 200A and a second unit magnet 200B in the circumferential direction. In addition, the first region A1 is longitudinally disposed in the axial direction.

Since the first region A1 is visually distinguished from other regions of the cover 1400, in a state in which the cover 1400 surrounds the magnets 1200, an arrangement state of the magnets 1200 may be checked visually or through an image thereof. Accordingly, an operator can easily check whether there is a problem in the arrangement of the magnets 1200.

Figure 22:
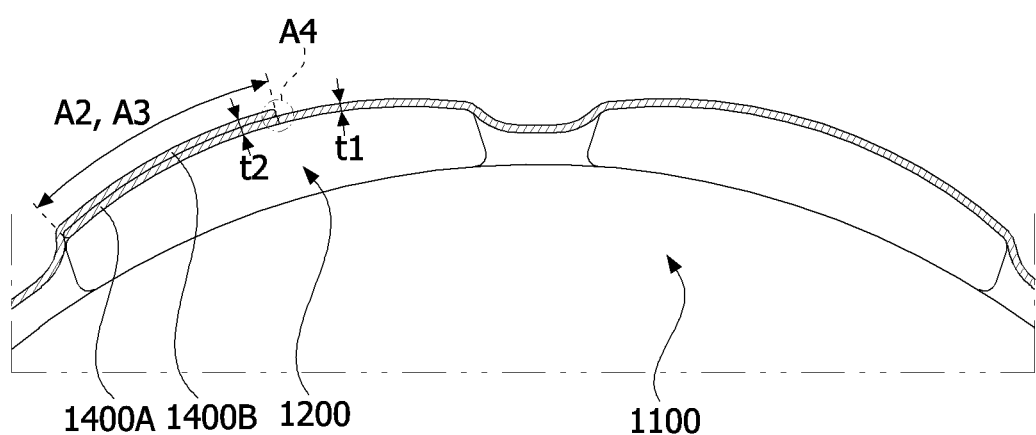
FIG. 22 is a plan cross-sectional view illustrating the shaft, the magnets, and a second region and a third region of the cover.

FIG. 22 is a plan cross-sectional view illustrating the shaft 1100, the magnets 1200, and a second region A2 and a third region A3 of the cover 1400.

Referring to FIG. 22, the cover 1400 may be wound around the shaft 1100 to form multiple layers. Hereinafter, a region in which the cover 1400 constitutes the multiple layers in the radial direction is referred to as the second region A2, and a region having a thickness t2 different from a thickness t1 of one region in the radial direction about the axial center is referred to as a third region A3.

In the second region A2, the cover 1400 may include a first layer 1400A and a second layer 1400B stacked on the first layer 1400A. In the drawing, the first layer 1400A and the second layer 1400B are illustrated, but the present invention is not limited thereto, and more layers such as a third layer and a fourth layer may also be formed. Accordingly, the second region A2 may be a region in which three or more layers are formed.

In FIG. 22, it is illustrated that a position of the second region A2 and a position of the third region A3 coincide with each other, but the present invention is not limited thereto, and the position of the second region A2 and the position of the third region A3 may also be different from each other.

An outer surface of the cover 1400 may include a stepped region A4.

Figure 23:
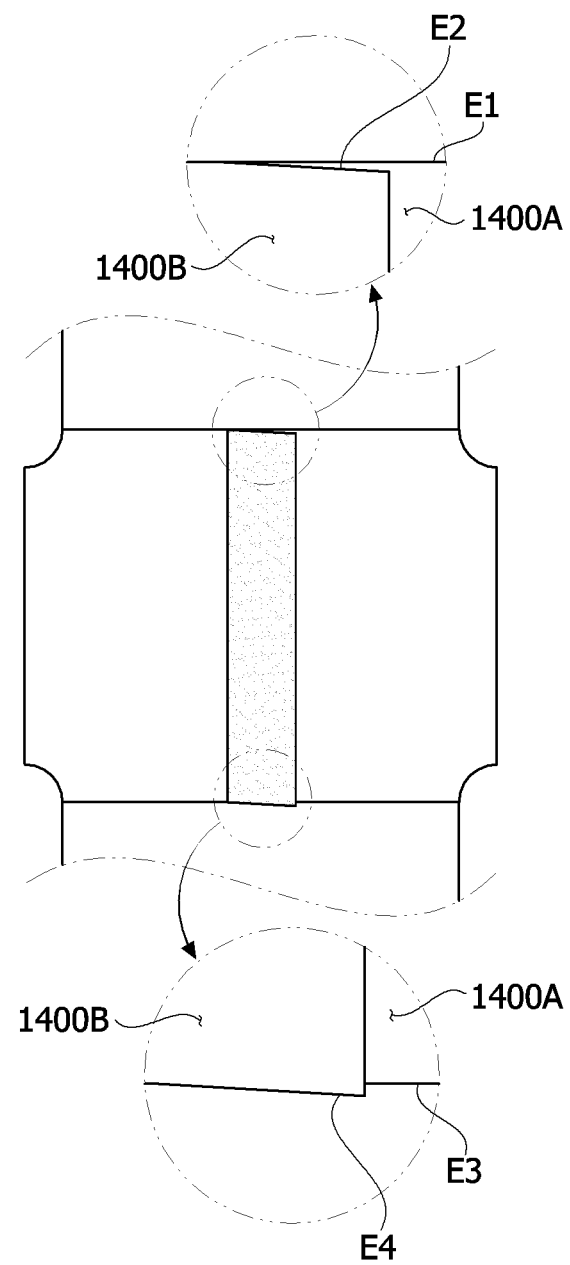
FIG. 23 is a view illustrating one side edges of the cover in the second region.

FIG. 23 is a view illustrating one side edges E1 and E2 of the cover 1400 in the second region A2.

Referring to FIG. 23, in the second region A2, one side edge E2 of any one layer may be disposed with an inclination with respect to one side edge E1 of the other layer. In addition, in the second region A2, the other side edge E4 of any one layer may be disposed with an inclination with respect to the other side edge E3 of the other layer. This may be a feature which is naturally generated in a process of winding the cover 1400 around the shaft 1100 and finishing and attaching an end of the cover 1400 to the shaft 1100.

Figure 24:
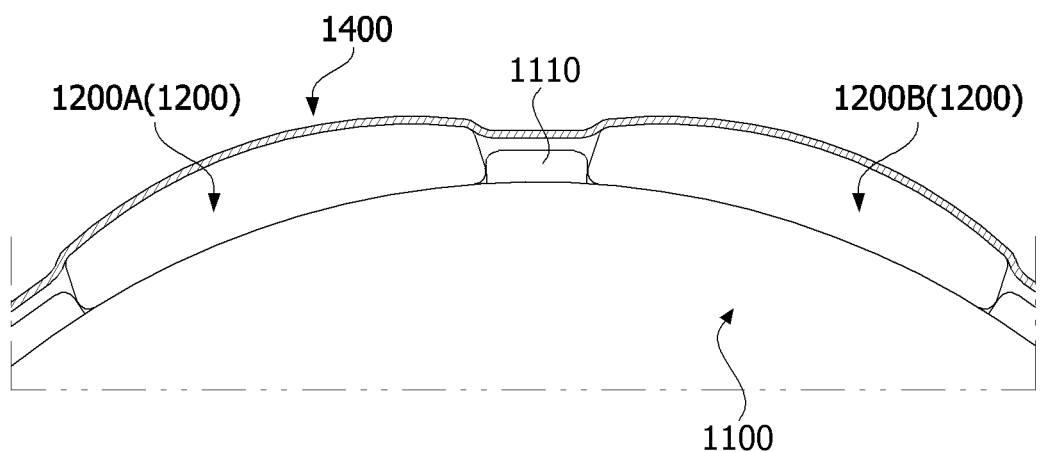
FIG. 24 is a plan cross-sectional view illustrating a shaft including protrusions and magnets.

FIG. 24 is a plan cross-sectional view illustrating a shaft 1100 including protrusions and magnets 1200.

Referring to FIG. 24, the shaft 1100 includes a plurality of protrusions 1110 in contact with the magnets 1200. The plurality of protrusions 1110 are disposed on an outer circumferential surface of the shaft 1100. The plurality of protrusions 1110 may be disposed apart from each other in a circumferential direction of the shaft 1100. In addition, the plurality of protrusions 1110 may be disposed apart from each other in an axial direction X of the shaft 1100. The protrusions 1110 serve to fixedly align the magnets 1200 disposed on the outer circumferential surface of the shaft 1100. The protrusions 1110 may be formed through an embossing process performed inside the shaft 1100.

The protrusions 1110 serve to prevent the magnets 1200 from being misaligned in a process in which a cover 1400 surrounds the magnets 1200. The protrusions 1110 may be disposed apart from the cover 1400.

I claim:

1. A motor comprising:
a housing;
a stator disposed in the housing;
a shaft disposed in the stator;
a guide part in contact with an outer circumferential surface of the shaft; and
a magnet coupled to the guide part,
wherein the guide part includes a first guide disposed on a side surface of the shaft and a second guide extending from the first guide in an axial direction,
wherein the first guide includes a plurality of protrusions that protrude inward from an inner circumferential surface of the first guide,
wherein the shaft includes a plurality of holes disposed on an outer circumferential surface of the shaft,
wherein the plurality of holes are formed to pass through an inner surface and an outer surface of the shaft,
wherein the plurality of protrusions are inserted into the plurality of holes, respectively,
wherein the second guide includes a body and an extension part extending from the body,
wherein a part of the magnet is disposed between the extension part and the shaft, and
wherein an end portion of the body has a tapered shape of which a width decreases toward an end thereof in the axial direction.

2. The motor of claim 1, wherein:
the first guide is disposed on one surface of the magnet; and
the second guide is disposed on a side surface of the magnet.

3. The motor of claim 1, wherein:
the magnet includes a first unit magnet and a second unit magnet; and
the second guide is disposed between the first unit magnet and the second unit magnet.

4. The motor of claim 1, wherein a length of the second guide is smaller than a length of the magnet.

5. The motor of claim 1, wherein the second guide includes an extension part in contact with a part of an outer side surface of the magnet.

6. The motor of claim 1, wherein:
the magnet includes a first unit magnet and a second unit magnet; and
the body is disposed between the first unit magnet and the second unit magnet.

7. The motor of claim 6, wherein the extension part includes:
a first extension part in contact with a part of an outer side surface of the first unit magnet; and
a second extension part in contact with an outer side surface of the second unit magnet.

8. The motor of claim 1,
wherein the first guide has a shape corresponding to a shape of an outer circumference of the shaft.

9. A motor comprising:
a housing;
a stator disposed in the housing;
a shaft disposed in the stator;
a guide part in contact with an outer circumferential surface of the shaft; and
a magnet coupled to the guide part,
wherein the guide part includes a first guide disposed on a side surface of the shaft and a second guide extending from the first guide in an axial direction,
wherein the first guide includes a plurality of protrusions that protrude inwardly from an inner circumferential surface of the first guide,
wherein the shaft includes a plurality of holes disposed on an outer circumferential surface of the shaft,
wherein the plurality of holes are formed to pass through an inner surface and an outer surface of the shaft,
wherein the plurality of protrusions are inserted into the plurality of holes, respectively, and
wherein the first guide has an arc shape and includes a gap formed between both ends of the first guide in a circumferential direction.

* * * * *